Oct. 23, 1951 O. C. ROESEN ET AL 2,572,666
APPARATUS FOR COOLING AND DRYING STEREOTYPE PLATES AND FOR
EFFECTING THE CONTROLLED APPLICATION OF COOLING AND DRYING
FLUIDS THERETO IN SYNCHRONISM WITH THE CONVEYING THEREOF
Original Filed Sept. 10, 1946 6 Sheets-Sheet 5
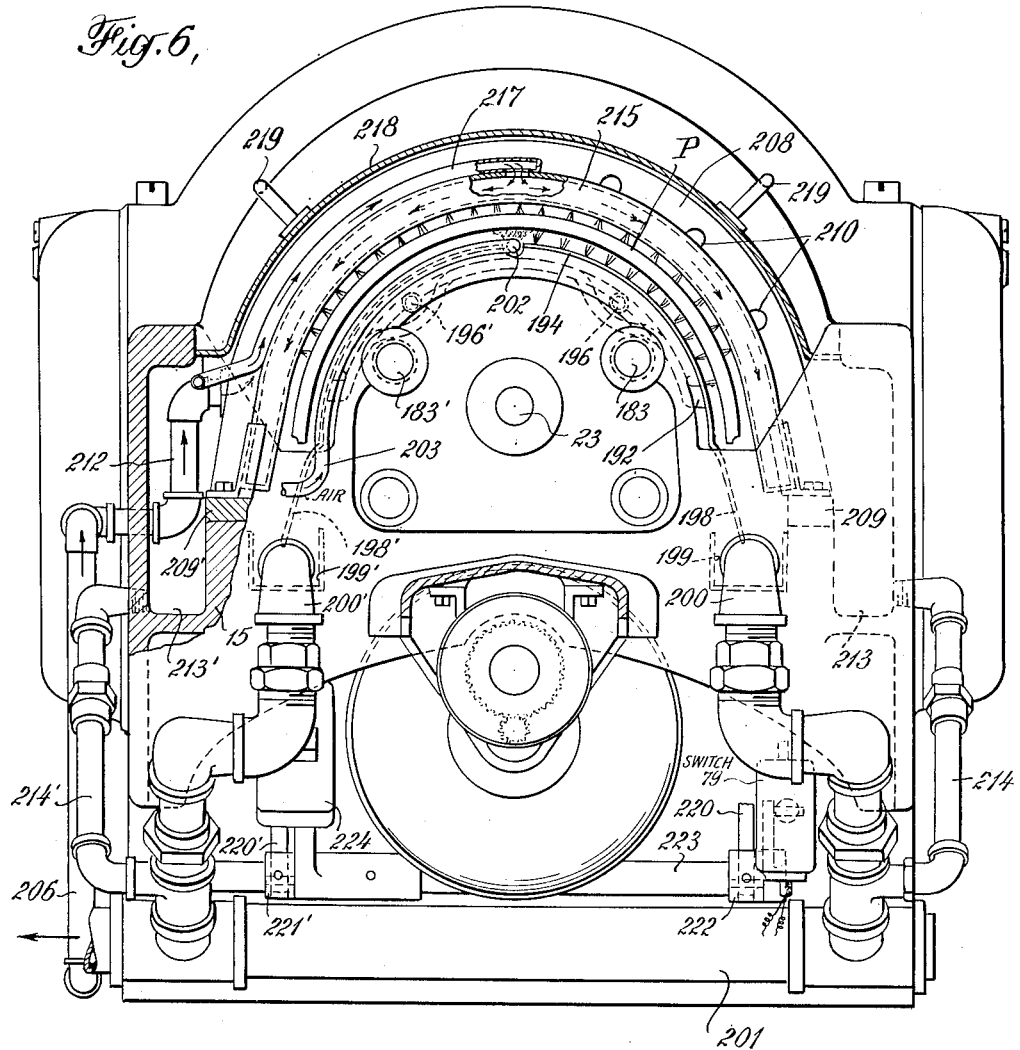
OSCAR C. ROESEN,
CHARLES L. RICARDS,
AND PAUL L. TOLLISON
INVENTORS
BY
Pennie, Edmonds, Morton & Barrows
ATTORNEYS Oct. 23, 1951   O. C. ROESEN ET AL   2,572,666
APPARATUS FOR COOLING AND DRYING STEREOTYPE PLATES AND FOR
EFFECTING THE CONTROLLED APPLICATION OF COOLING AND DRYING
FLUIDS THERETO IN SYNCHRONISM WITH THE CONVEYING THEREOF
Original Filed Sept. 10, 1946                        6 Sheets-Sheet 6
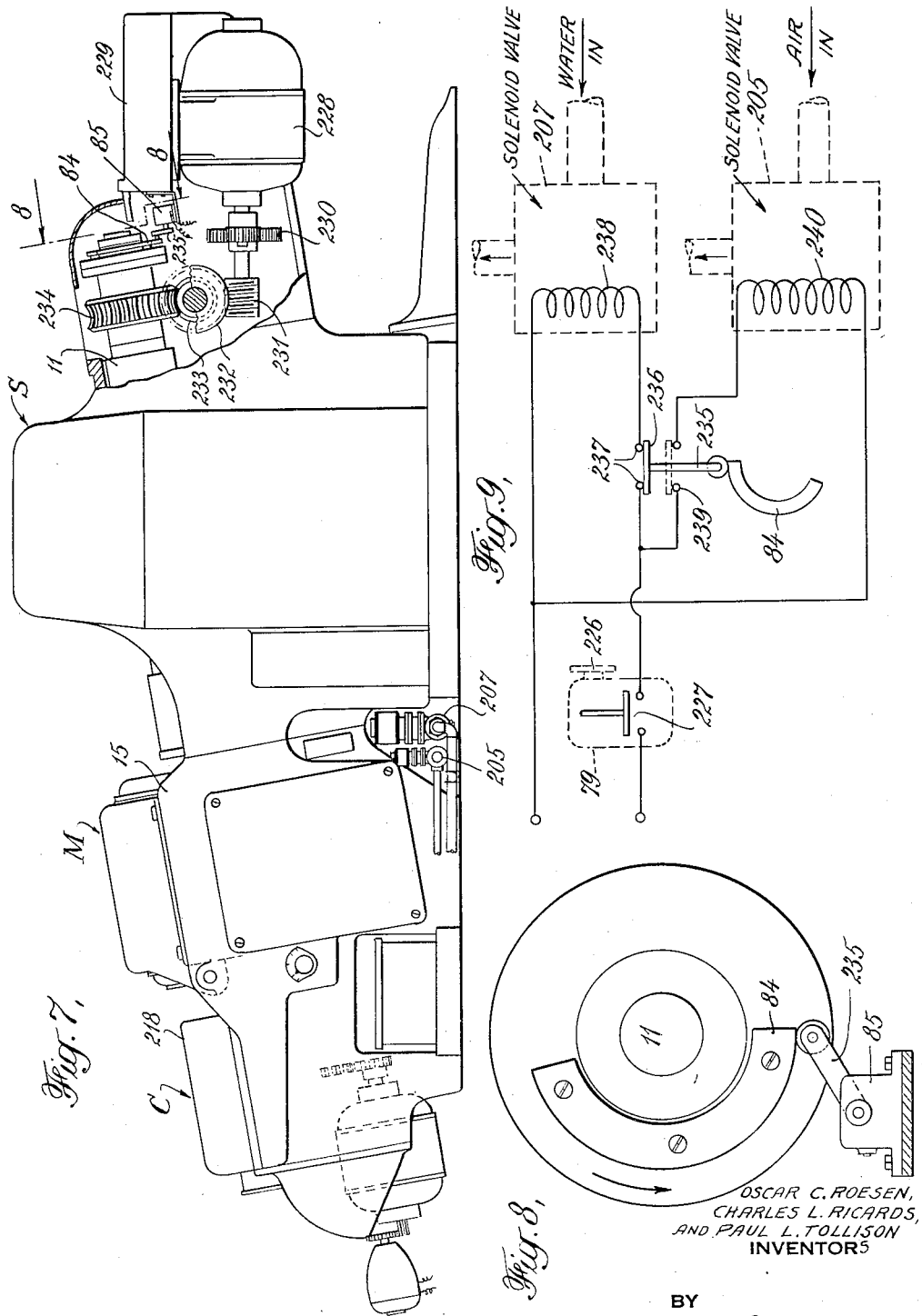
OSCAR C. ROESEN,
CHARLES L. RICARDS,
AND PAUL L. TOLLISON
INVENTORS
BY
Pennie, Edmonds, Morton + Barrows
ATTORNEYS Patented Oct. 23, 1951

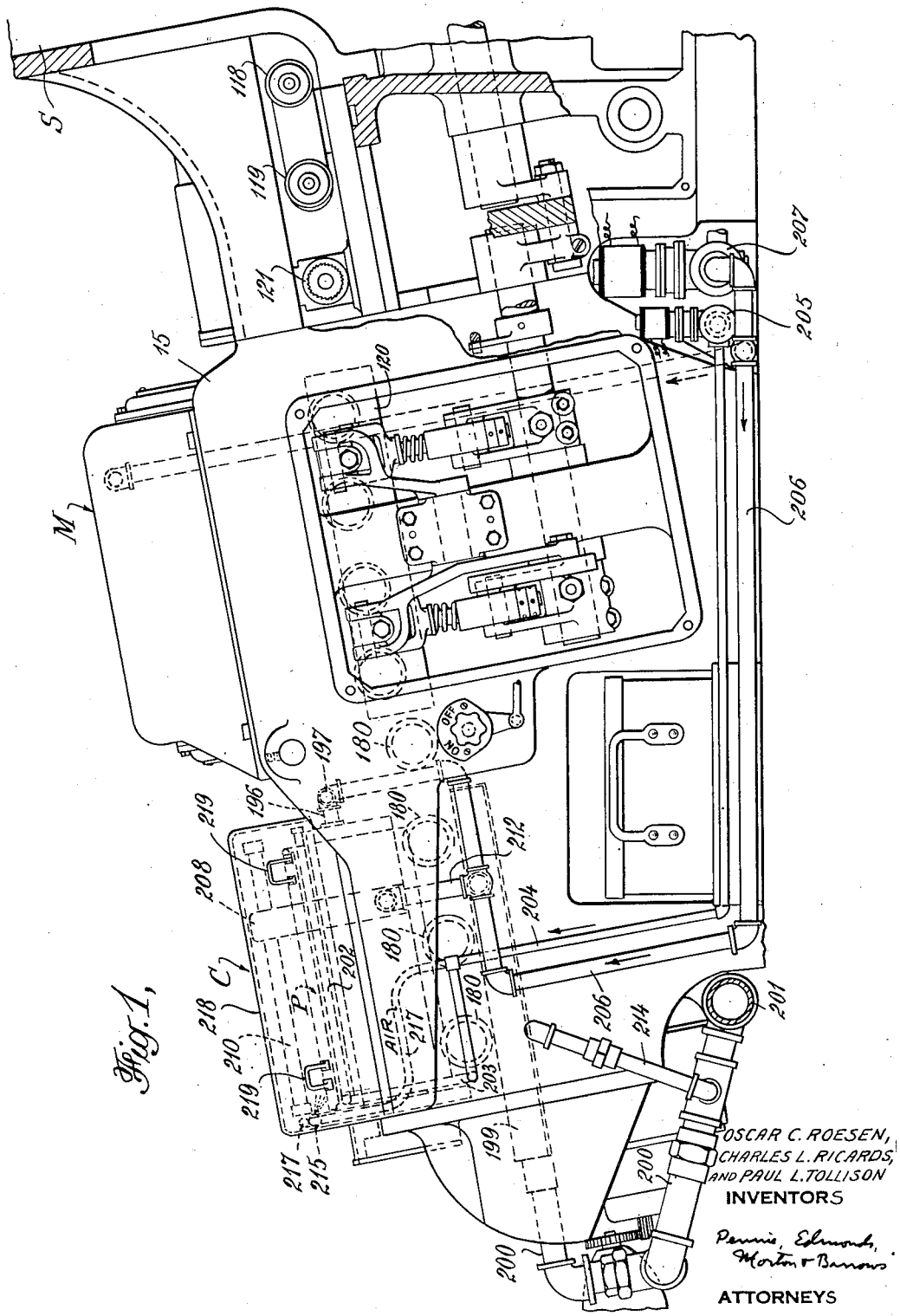

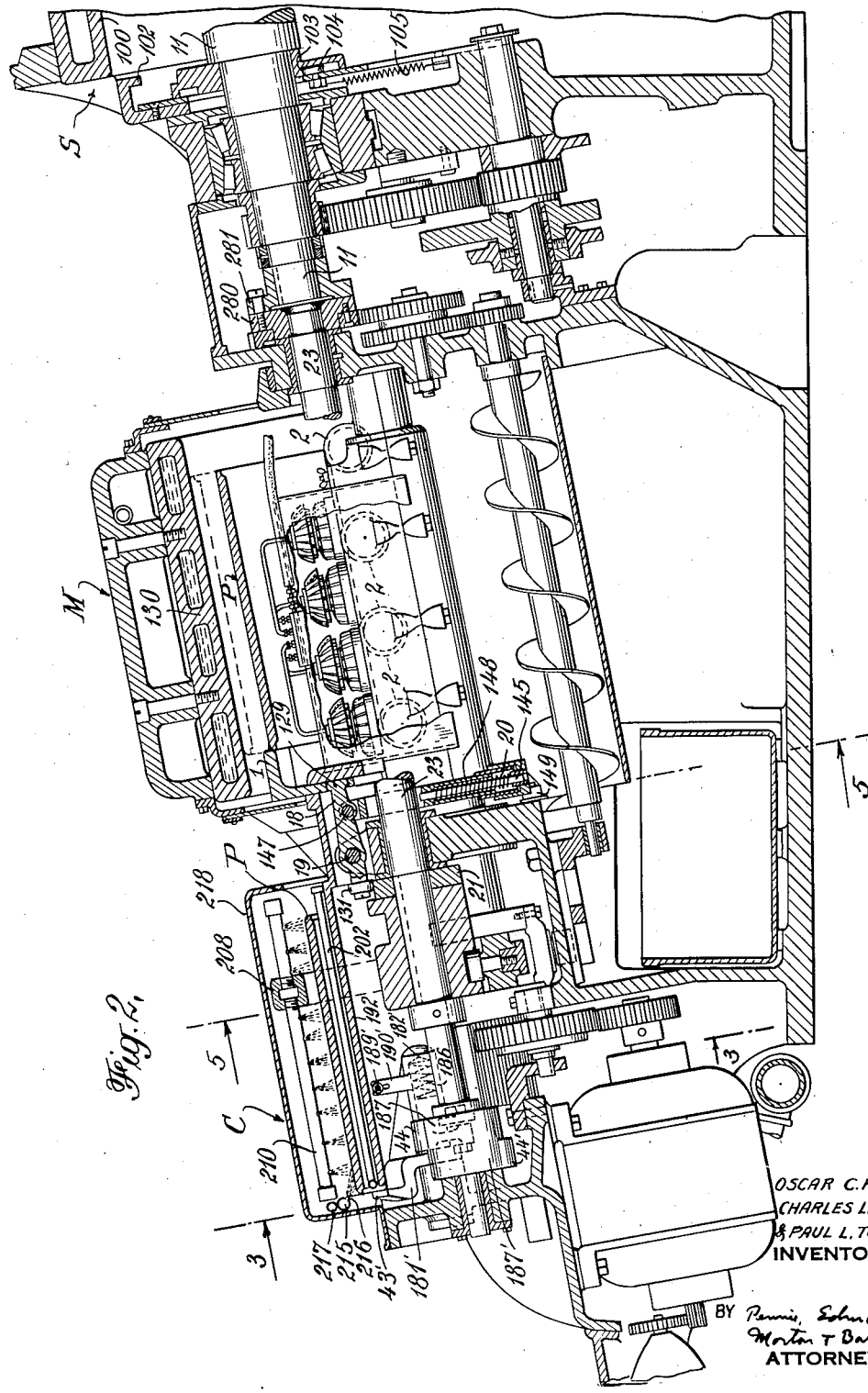

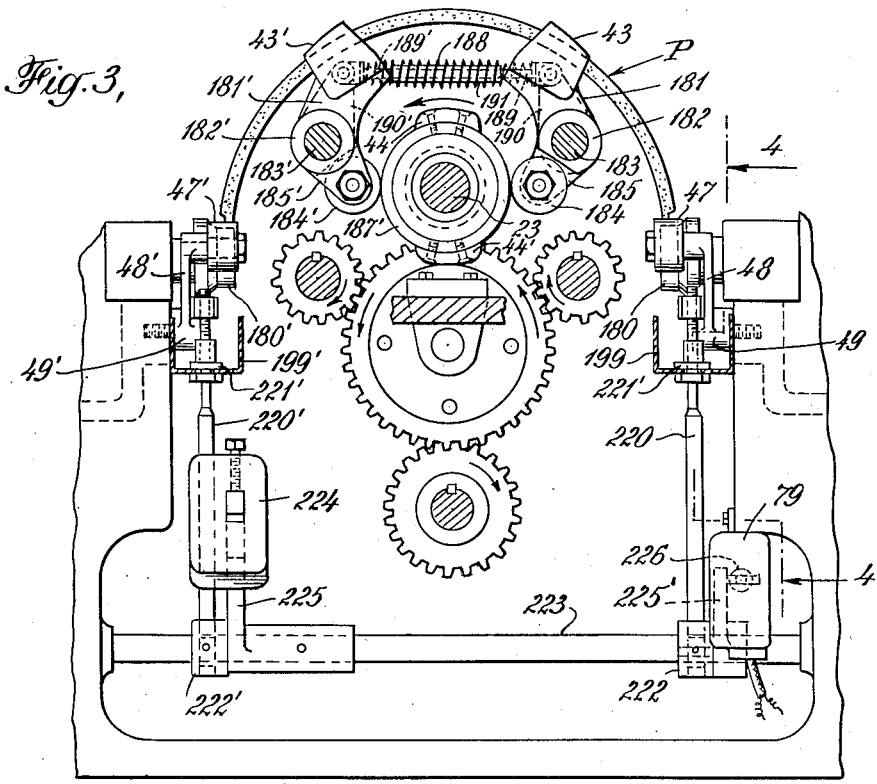

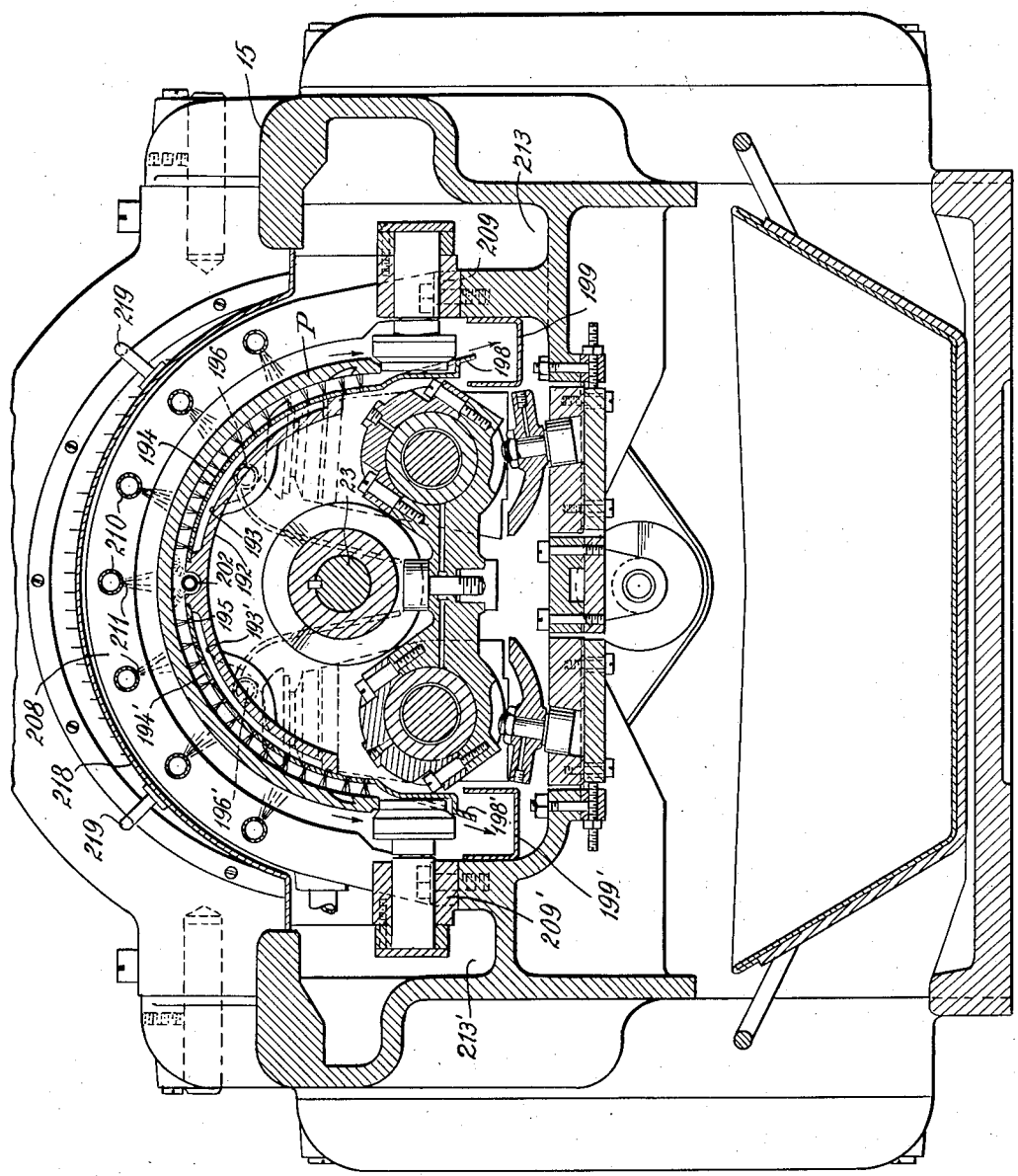

2,572,666

UNITED STATES PATENT OFFICE 2,572,666

APPARATUS FOR COOLING AND DRYING STEREOTYPE PLATES AND FOR EFFECTING THE CONTROLLED APPLICATION OF COOLING AND DRYING FLUIDS THERETO IN SYNCHRONISM WITH THE CONVEYING THEREOF

Oscar C. Roesen, Scarsdale, N. Y., and Charles L. Ricards, South Plainfield, and Paul L. Tollison, North Plainfield, N. J., assignors to Wood Newspaper Machinery Corporation, Plainfield, N. J., a corporation of Virginia Original application September 10, 1946, Serial No. 695,964. Divided and this application October 1, 1948, Serial No. 52,322

7 Claims. (Cl. 134—95)

This invention relates to a stereotype plate finishing machine and more particularly to an improved machine of this nature incorporating means by which cast and finished plates may be cooled and dried.

The plate cooling and drying mechanism of the present invention is shown in connection with a machine useful in finishing semi-cylindrical stereotype plates that are secured to the press cylinders by clamping elements that hold the plates under circumferential tension. For this purpose, the plates are provided with a series of recesses or pockets in their inner surfaces adjacent their straight edges for the reception of clamping means on the press cylinders. The machine shown forms such pockets by milling them in the pre-cast plate. The finishing machine is described and claimed in our copending application Serial No. 695,964 filed September 10, 1946 and entitled "Stereotype Plate Forming and Finishing Machine" and which issued November 28, 1950 as U. S. Patent No. 2,531,647. This application is a division of the aforsaid application.

It is an object of the present invention to provide an improved combined stereotype plate cooling and drying mechanism and means for controlling the operation thereof. Other objects, advantages and characteristic features of the invention will become apparent from the following description of certain embodiments of our improved mechanism.

In describing the invention in detail, reference will be made to the accompanying drawings in which an embodiment of our invention has been illustrated. In the drawings:

Fig. 1 is an elevation of a machine embodying our cooling and drying apparatus;

Fig. 2 is a central sectional elevation of the machine of Fig. 1;

Fig. 3 is a transverse section taken along the line 3—3 of Fig. 2 and viewed in the direction of the arrows;

Fig. 4 is a sectional view taken along the line 4—4 of Fig. 3;

Fig. 5 is a transverse section taken along the line 5—5 of Fig. 2;

Fig. 6 is a discharge end view of the cooling and drying section of the machine with certain of the parts removed or broken away to show the interior construction;

Fig. 7 is a side elevation of the complete machine showing the driving means for the main central shaft and a part of the control means that govern the action of the cooling and drying section;

Fig. 8 is an enlarged elevation of the control cam on the main central shaft, taken along the line 8—8 of Fig. 7; and Fig. 9 is a wiring diagram of the apparatus for controlling the supply of water and air to the cooling and drying apparatus.

The mechanism illustrated in Figs. 1 and 2 constitutes generally the pocket milling section M and the cooling and drying section C of a plate finishing machine. The machine also includes a plate shaving section S, the discharge end of which is illustrated at the right of Figs. 1 and 2. The entire machine is illustrated in Fig. 7. The plate shaving section S is disclosed in United States Patent No. 2,364,032, and it will not be described in detail herein. It should be understood that the shaving section includes a shaving arch 100 with a central main shaft 11 therein which is continuously rotated by a drive motor 228. This main shaft and a continuation thereof constitutes a means for governing the cyclic operation of the several plate finishing and cooling sections of the machine as well as the progress of successive plates through the machine sections.

A vertically reciprocable stop or gate 102 is provided at the discharge end of the arch 100 and is operated by cam 103 on the shaft 11. A cam follower 104 engages the cam 103 and is connected to the stop 102. A spring 105 is employed to bias the stop upward and so to maintain the follower 104 in contact with the cam surface. The arrangement is such that the stop 102 is lowered to permit the discharge of a plate from the shaving section at the end of each cycle of the machine operation which is timed by one revolution of the main shaft 11.

When the stop 102 is lowered, a stereotype plate moves by gravity along the inclined path defined by the rollers 118, 119 and 121 and corresponding rollers on the rearward side of the machine. The plate then moves along the plate lifting rollers 2, in the milling section M until it comes to rest with its lower curved edge engaging the plate stop 1 at the lower end of the pocket milling section, as shown at P in Fig. 2. The pocket milling section is provided with mechanism for lifting the individual plates to fixed raised positions in contact with the arch liner 130, in which positions the plates are milled.

When in such position, suitable milling mechanism acts to mill pockets in the plates as described in detail in our copending application Serial No. 695,964 referred to above.

Due to the inclined position of the plate P in the pocket milling section M, it has a tendency to move outward by gravity from this section in all operating positions except when it is clamped against the arch liner 130 by the lifting mechanism including the bar 120. Such movement of the plate out of the milling section is prevented by the stop 1, and mechanism is provided to normally move this stop up and down in synchronism with the cyclic operation of the machine in performing the pocket milling operation. A lever 18, fulcrumed on a fixed stud 19 pivotally engages the stop 1 at 129 (Fig. 2). A cam follower roller 131 is carried by the opposite end of the lever 18 and engages a cam 21 fixed to the central shaft 23. A compressed spring 20 surrounds a rod 145 fixed to a sleeve 148 that is pivotally connected to the lever 18 at 147. The lower end of the spring 20 engages a fixed bracket 149 and the spring normally holds the roller 131 in contact with the cam 21 and lifts the plate stop 1 when the roller 131 engages the depressed part of the cam 21. The shaft 23 is connected to the main shaft 11 by interconnected flanges 280 and 281, and so forms a continuation of the shaft 11 and turns through one revolution for each operating cycle of the machine. The cam 21 is so shaped as to lift the stop 1 in synchronism with the action of the above described plate lifting mechanism. Thus the stop 1 is extended to hold the plate against movement out of the pocket milling section when the plate moves into this section and thereafter while the plate is lifted to and lowered from its clamped position, and the stop is retracted to move below the plate and so release it for movement out of the milling section after the plate has been lowered following a pocket milling operation. After the release of the plate by the stop 1, the cam 21 again extends the stop to a position to arrest the movement of the next successive plate fed into the pocket milling section.

After leaving the milling section M, the successive plates P pass into the cooling and drying section C of the machine along the rollers 180 and 180' adjacent the opposite sides of this section, and the successive plates are held in this section by the stops 43 and 43' adjacent the lower or oulet end of the section (Figs. 1, 2, 3 and 4). The stops 43 and 43' are respectively carried on upwardly extending arms 181, 181' of hollow sleeves 182, 182' which are slidably and rotatably carried on fixed stub shafts 183, 183'. Coiled compression springs, one of which is shown at 186 of Fig. 2, are interposed between the upper ends of the shafts 183, 183' and sleeves 182, 182' to permit resilient yielding movement of the stops carried by the sleeves toward the outlet end of the machine and thereby cushion the shock or impact caused by a plate striking the stops 43, 43'. Cam rollers 184, 184' are carried by depending arms 185, 185' on the sleeves 182, 182'. These rollers respectively engage cams 187, 187' fixed to the central main shaft 23 at longitudinally spaced points thereon, and oppositely disposed cam extensions 44 and 44' are provided on these cams. The stops 43 and 43' are biased toward their outward plate stopping positions, and the rollers 184 and 184' are held in contact with their respective cams 187 and 187' by a compressed spring 188 surrounding rods 189, 189' pivotally connected respectively to arms 190, 190' on the stop sleeves 182, 182' (Figs. 2 and 3). The rods 189 and 189' are slidably retained in alignment by a sleeve 191 within the spring 188. With this arrangement, the stops 43 and 43' are retracted to release a plate P from the cooling and drying section C at the end of each cooling and drying cycle, and are returned to stopping position immediately after the plate has moved out of the cooling section.

The cooling section contains a lower arch shaped spray casting 192 having water conducting depressions 193 and 193' in its outer surface. Spray plates 194 and 194' having openings 195 therein respectively cover the water conducting depressions 193 and 193' of the casting 192. The openings 195 serve as nozzles to spray water from the depressions 193 and 193' outwardly onto the under surface of the plate P (Figs. 5 and 6). Water is conducted into the depressions 193 and 193' of the casting 192 by pipes 196 and 196' connected to a pipe 197 which in turn is connected through a pipe 206 to a solenoid operated water supply valve 207 (Figs. 1, 5 and 6). The spray plates 194 and 194' have imperforate side extensions forming skirts 198 and 198' that extend below the casting 192 and terminate in the side troughs 199 and 199' (Figs. 1, 3, 5 and 6). Drain pipes 200 and 200' are connected to the lower ends of these troughs and led to a common transverse drain 201 (Figs. 1 and 6).

An under air pipe 202 extends along the top of the casting 192 in a groove therein and is provided with openings which direct jets of air upwardly and outwardly on the under surface of the plate, as shown in Figs. 5 and 6. An extension 203 of this pipe 202 is connected through the pipe 204 to a solenoid operated air supply valve 205 (Fig. 1).

An arch shaped outer water manifold 208 is suitably supported on extensions 209, 209' of the main frame intermediate the ends of the cooling and drying section, and extends close to and above the path of a plate in this section. Upper spray pipes 210 are connected to and extend in opposite directions from the manifold 208 along the length of the cooling and drying section and are provided with downwardly directed openings 211 through which water may be sprayed on the outer surface of the plate P (Figs. 1, 2 and 5). A pipe 212 conducts water from the pipe 206 to the manifold 208 (Figs. 1 and 6). As shown in Figs. 5 and 6, the frame 15 forms troughs 213 and 213' below and outside of the frame extensions 209, 209' in which some of the cooling water may collect, and drain pipes 214, 214' connect these respective troughs with the drain pipes 200 and 200', as shown in Figs. 1 and 6.

An outer arcuate air pipe 215 extends above the plate path just below the lower ends of the water spray pipes 210 at the outlet end of the cooling and drying section and is supported by suitable securement of its opposite ends to the frame extensions 209, 209' (Figs. 1, 2 and 6). A plurality of holes 216 extend through this pipe 215 in a direction radially inward and longitudinally rearward of a plate P so that the air jets passing through these holes strip water from the plate and force the water back toward the interior of the cooling and drying section as the plate moves out of this section. In order to insure that the air jets from these holes 216 are directed downward on both sides of the arcuate outer plate surface, the air inlet pipe 217 is connected to the arcuate air pipe 215 at its uppermost central point. The pipe 217 is connected to the air supply pipe 204 (Fig. 1). An arch shaped removable cover 218 is provided for the cooling and drying section C, and handles 219 thereon facilitate its removal.

In accordance with the invention, the supply of both cooling water and drying air to each plate in the combined cooling and drying section C is primarily governed by the movement of a plate into this section, the successive supply of first water and then air being controlled by the cyclic timing rotation of the main shaft of the machine. With this arrangement, the supply of water and air is initiated only if a plate is present in the cooling and drying section.

The plate movement responsive means for providing this control is shown in Figs. 3 and 4 and includes a pair of rollers 47 and 47' disposed at opposite sides of the machine in the path of the opposite side edges of the plates and adjacent the lowermost of the plate carrying rollers 180, 180'. The rollers 47 and 47' are respectively carried by arms 48 and 48' pivotally connected tto the frame at 49, 49'. Operating rods 220 and 220' are respectively pivotally connected to the roller arms 48 and 48' and pass through stuffing glands 221, 221' in the troughs 199, 199'. The lower ends of the rods 220, 220' are respectively pivotally connected to crank arms 222, 222' fixed to a transverse shaft 223 journaled at its end in the machine frame. A counter weight 224 adjustably supported on a crank arm 225 fixed to the shaft 223 normally biases the connected mechanism so as to move a switch operating arm 225' which is fixed to the shaft 223 to a position to depress the plunger 226 of a switch 79 and so open the contacts 227 of this switch (Figs. 6 and 9). In this position, the rollers 47 and 47' are lifted slightly above the path of the lower side edges of a plate P supported by the conveying rollers 180, 180' of the cooling and drying section, as shown in Fig. 4. When a plate moves down into the cooling and drying section and its leading end approaches the stops 43 and 43', its side edges strike and depress the rollers 47 and 47' and so turn the shaft 223 clockwise as viewed in Fig. 4, permitting the plunger 226 of the switch 79 to move outward and close the contacts 227 of the switch. This switch closure supplies current to successively energize the solenoids which open the water and air valves 207 and 205 through control mechanism described below.

Referring to Fig. 7, the main central shaft 11 of the machine is driven by a motor 228 carried by a bracket 229 at the upper end of the machine above the shaving section S. The motor 228 drives the shaft 11 through the gear train 230, the worm 231, worm wheel 232, worm 233 and the worm wheel 234 fixed to the shaft 11.

The upper end of the shaft 11 carries a cam 84 which extends around substantially one-half the circumference of the shaft and cooperates with the operating lever 235 of a switch 85. The arrangement is such that when the operating arm 235 is depressed by the cam 84, the movable contact 236 of the switch engages the stationary contacts 237 thereof and completes an energizing circuit for the solenoid winding 238 of the water valve 207, provided the switch 79 operated by a plate in the cooling and drying section C has been closed as described above. The energizing circuit for the water valve solenoid 238 is readily apparent from the wiring diagram (Fig. 9). The cam 84 closes the switch 85 just after the point in the cycle of operation at which the plate stop 1 at the exit end of the milling section M has been retracted to permit a plate to pass into the cooling and drying section. Thus water is supplied simultaneosuly to the upper and lower surfaces of the plate in the cooling and drying section for substantially one-half of the cycle of machine operation, whereupon the cam 84 releases the switch arm 235 and the movable contact 236 of the switch 85 connects the stationary contacts 239. This results in a de-energization of the water valve solenoid 238 closing the water valve 207, and the energization of the solenoid 240 which opens the air valve 205. Thereafter for the remaining half of the cycle, compressed air is delivered from the air valve to the above described outlets in the cooling and drying section with the result that the cooling water is blown off of the inner and outer surfaces of the plate. The energizing circuit for the air valve solenoid 240 is clearly shown in Fig. 9. While the air valve 205 is still open, and shortly before the end of the cooling and drying cycle, the stops 43 and 43' are retracted by the cam mechanism on the shaft 23 which has been described above, and the plate moves out of the cooling and drying section. Air jets from the arcuate outer air pipe 215 play on the outer surface of the plate as it moves, stripping water from the plate surface and forcing the water back into the interior of the cooling and drying section. Just before the plate leaves the cooling and drying section, the trailing ends of its side edges leave the rollers 47 and 47', and the switch 79 is thereby opened, de-energizing the solenoid 240 of the air valve 205 and thus cutting off the supply of air. This completes the cooling and drying cycle which is again initiated during the next revolution of the main shaft after a short interval to permit another plate to move into the cooling and drying section C.

We claim:

1. In a machine of the character described, in combination, a cooling and drying section, inclined stereotype plate carrying means for conducting semi-cylindrical stereotype plates into and out of said section, a retractable inlet stop for admitting a plate to said section when retracted, a retractable outlet stop for holding a plate in said section and releasing it therefrom when retracted, water and air supply ducts in said section for directing water and air onto a plate in said section, a continuously operated control element for periodically retracting and extending said outlet stop to release a plate from said section and retracting and extending said inlet stop to admit a plate to said section, and fluid supply means operable by said control element during the cyclic intervals between the operation of said stops for first supplying water to said water ducts during an initial part of said interval and then discontinuing said water supply and supplying air to said air ducts during the remainder of said interval.

2. In a machine of the character described, in combination, a cooling and drying section, inclined stereotype plate carrying means for conducting semi-cylindrical stereotype plates into and out of said section, a retractable inlet stop for admitting a plate to said section when retracted, a retractable outlet stop for holding a plate in said section and releasing it therefrom when retracted, water and air supply ducts in said section for directing water and air onto a plate in said section, a continuously operated control element for periodically retracting and extending said outlet stop to release a plate from said section and retracting and extending said inlet stop to admit a plate to said section, fluid supply means operable by said control element during the cyclic intervals between the operation of said stops for first supplying water to said water ducts during an initial part of said interval and then discontinuing said water supply and supplying air to said air ducts during the remainder of said interval, and means responsive to the presence of a plate in said section for placing said control element in operative condition to actuate said fluid means.

3. In a machine of the character described, in combination, a cooling and drying section, inclined stereotype plate carrying means for conducting semi-cylindrical stereotype plates into and out of said section, a retractable inlet stop for admitting a plate to said section when retracted, a retractable outlet stop for holding a plate in said section and releasing it therefrom when retracted, water and air supply ducts in said section for directing water and air onto a plate in said section, a continuously rotating central control shaft, means on said shaft for periodically retracting and extending said stops to both release a plate from said section and admit a plate to said section, fluid supply means operable by said shaft during the cyclic intervals between successive operations of said stops for supplying water to said water ducts during the initial part of each such interval and for discontinuing the water supply and supplying air to said air ducts during the remainder of each such interval, and means responsive to the movement of a plate into said section on said carrying means for placing said fluid supply means in operative condition to supply water to said water ducts when operated by said shaft.

4. In a machine of the character described, a plate cooling and drying section comprising a plurality of upper water ducts arranged in arch-shaped formation and having downwardly directed outlets, a plurality of lower arch-shaped water ducts beneath and spaced from said upper ducts and having upwardly directed outlets, a lower air duct having upwardly directed outlets extending longitudinally along the crest of said lower arched water ducts, an arched upper air duct adjacent one end of said water ducts and having openings directed downwardly and inwardly of said section, means for conveying a substantially semi-cylindrical stereotype plate into said section between said upper and lower water ducts and out of said section at the end occupied by said arched upper air duct, and means for supplying water and air respectively to said water and air ducts.

5. In a machine of the character described, a plate cooling and drying section comprising a plurality of upper water ducts arranged in arch-shaped formation and having downwardly directed outlets, a plurality of lower arch-shaped water ducts beneath and spaced from said upper ducts and having upwardly directed outlets, a lower air duct having upwardly directed outlets extending longitudinally along the crest of said lower arched water ducts, an arched upper air duct adjacent one end of said water ducts and having openings directed downwardly and inwardly of said section, means for conveying a substantially semi-cylindrical stereotype plate into said section between said upper and lower water ducts and out of said section at the end occupied by said arched upper air duct, means for holding a plate in said section for an interval, means for supplying water to said water ducts during an initial part of such interval and means for supplying air to said air ducts for the remainder of said interval and during movement of said plate out of said section under said upper air duct.

6. In a machine of the character described, a plate cooling and drying section comprising a plurality of upper water ducts arranged in arch-shaped formation and having downwardly directed outlets, a plurality of lower arch-shaped water ducts beneath and spaced from said upper ducts and having upwardly directed outlets, a lower air duct having upwardly directed outlets extending longitudinally along the crest of said lower arched water ducts, an arched upper air duct adjacent one end of said water ducts and having openings directed downwardly and inwardly of said section, means for conveying a substantially semi-cylindrical stereotype plate into said section between said upper and lower water ducts and out of said section at the end occupied by said arched upper air duct, plate control means for periodically releasing a plate from said section and admitting another plate into said section, and means operated in timed relation with said plate control means for first supplying water to said water ducts, then cutting off the water supply and supplying air to said air ducts during the intervals following each such periodic admission of a plate into the section, said control means continuing the supply of air to said air ducts as the plate moves out of the section following the periodic release thereof whereby water is stripped from the upper surface of the plate by air from said upper air duct as the plate moves out of said section.

7. In a machine of the character described, a plate cooling and drying section comprising a plurality of lower arch-shaped water ducts having upwardly directed outlets, a lower air duct having upwardly directed outlets extending longitudinally along the crest of said lower arched water ducts, means for conveying a substantially semi-cylindrical stereotype plate into said section above and adjacent said lower water ducts and out of said section, means for holding a plate so conveyed in said section for an interval, means for supplying water to said water ducts during an initial part of such interval and means for supplying air to said air ducts for the remainder of said interval and during movement of the plate out of said section.

OSCAR C. ROESEN.
CHARLES L. RICARDS.
PAUL L. TOLLISON.

REFERENCES CITED

The following references are of record in the file of this patent:

UNITED STATES PATENTS

| Number | Name | Date |
|---|---|---|
| 584,988 | Clement | June 22, 1897 |
| 1,269,239 | Wood | June 11, 1918 |
| 1,843,471 | Wood | Feb. 2, 1932 |
| 2,225,946 | Arey | Dec. 24, 1940 |
| 2,255,018 | Wilson | Sept. 2, 1941 |
| 2,258,562 | Arey et al. | Oct. 7, 1941 |
| 2,364,032 | Wood et al. | Nov. 28, 1944 |
| 2,418,934 | Hirsch | Apr. 15, 1947 |